July 23, 1957  J. C. SHEPHERD  2,800,454
GEL REFRIGERANT AND A METHOD OF MAKING SAME
Filed June 22, 1953  6 Sheets-Sheet 4
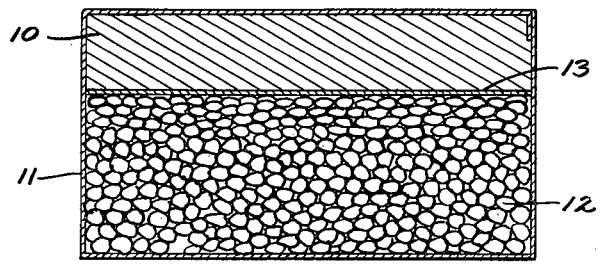
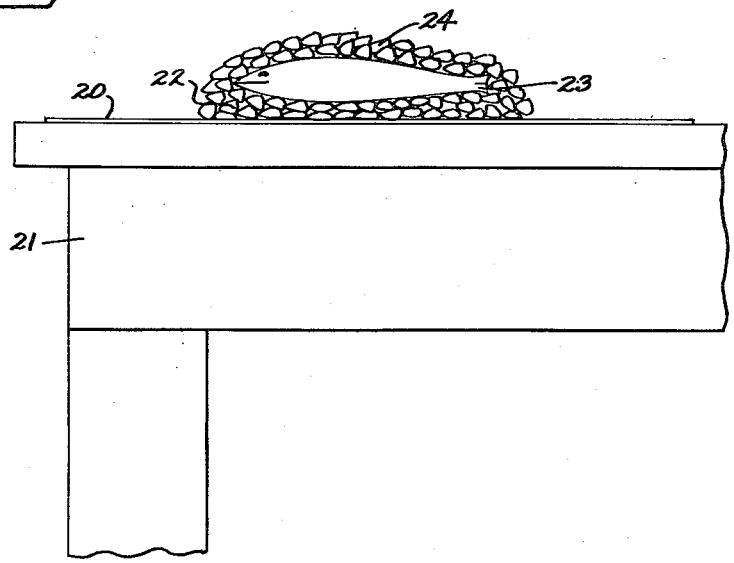
INVENTOR.
JOHN C. SHEPHERD
BY
ATTORNEY

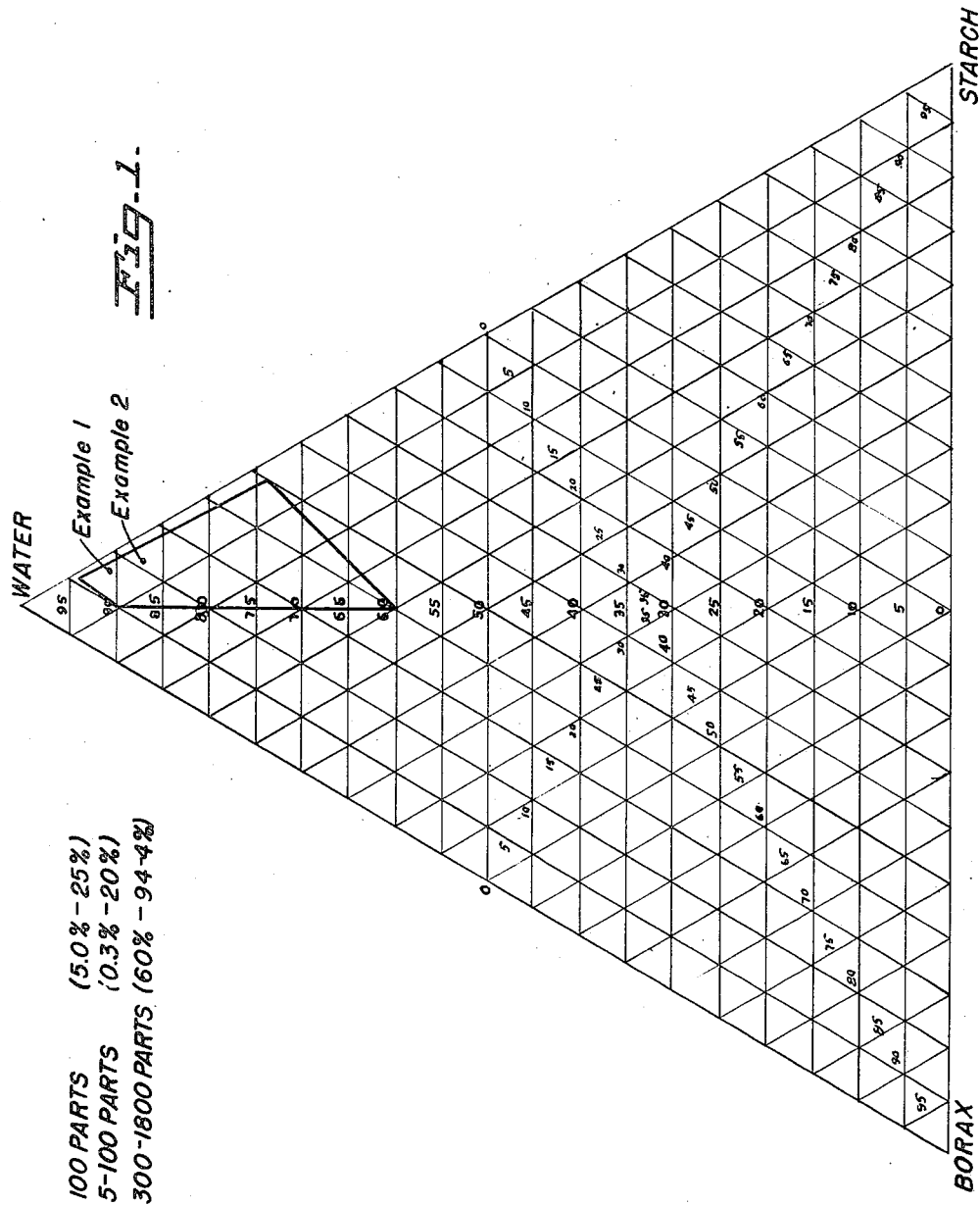

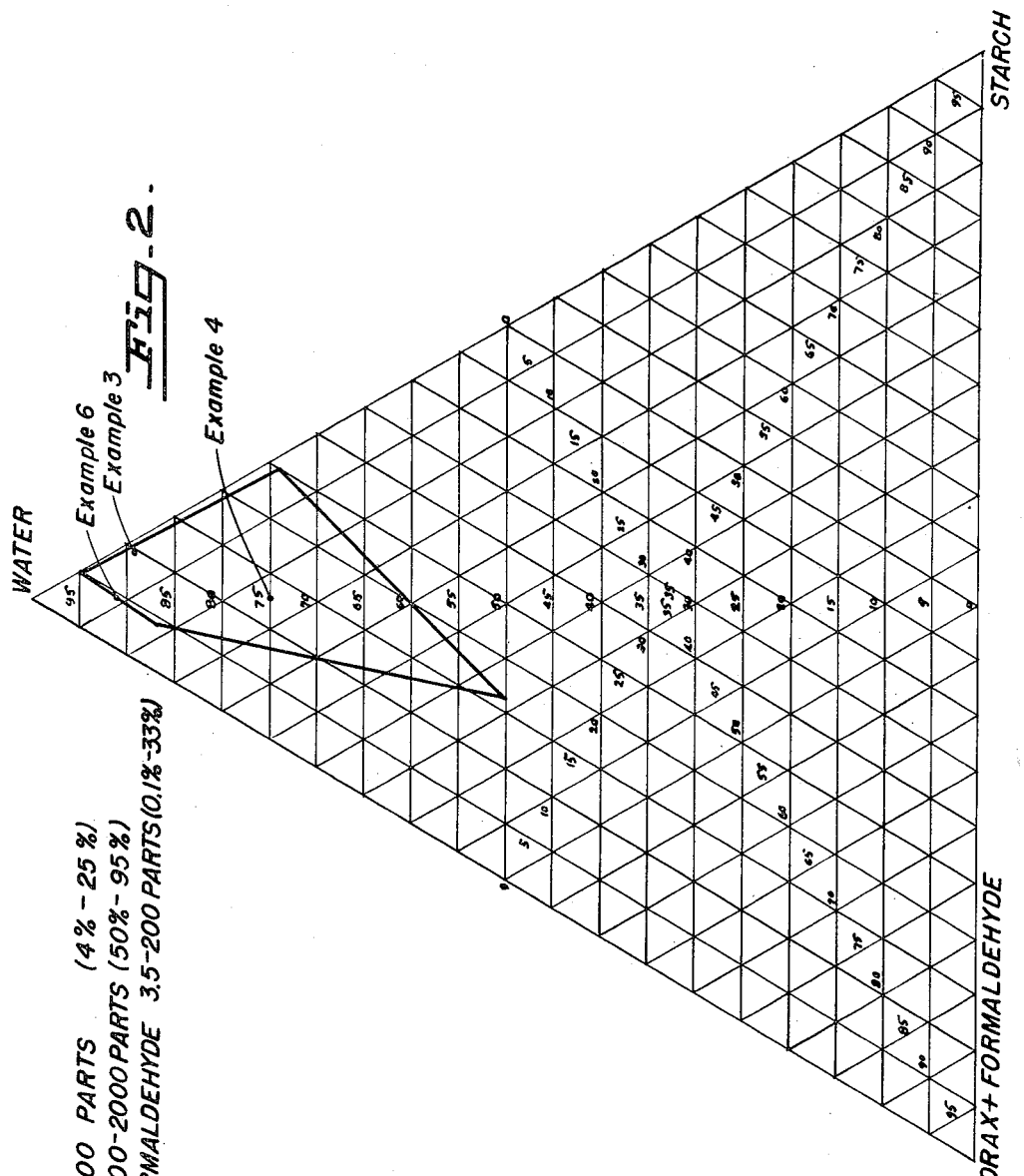

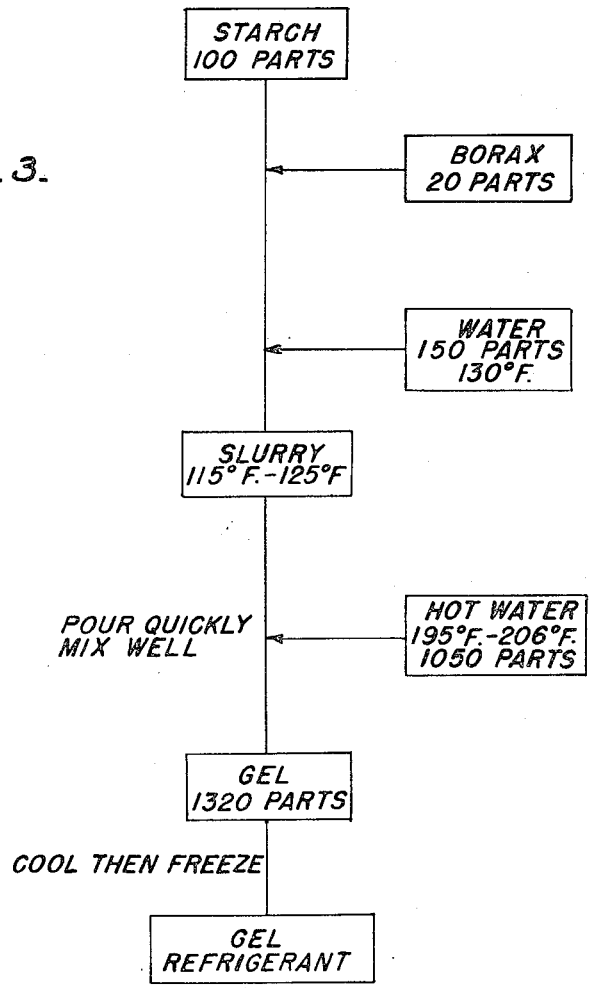

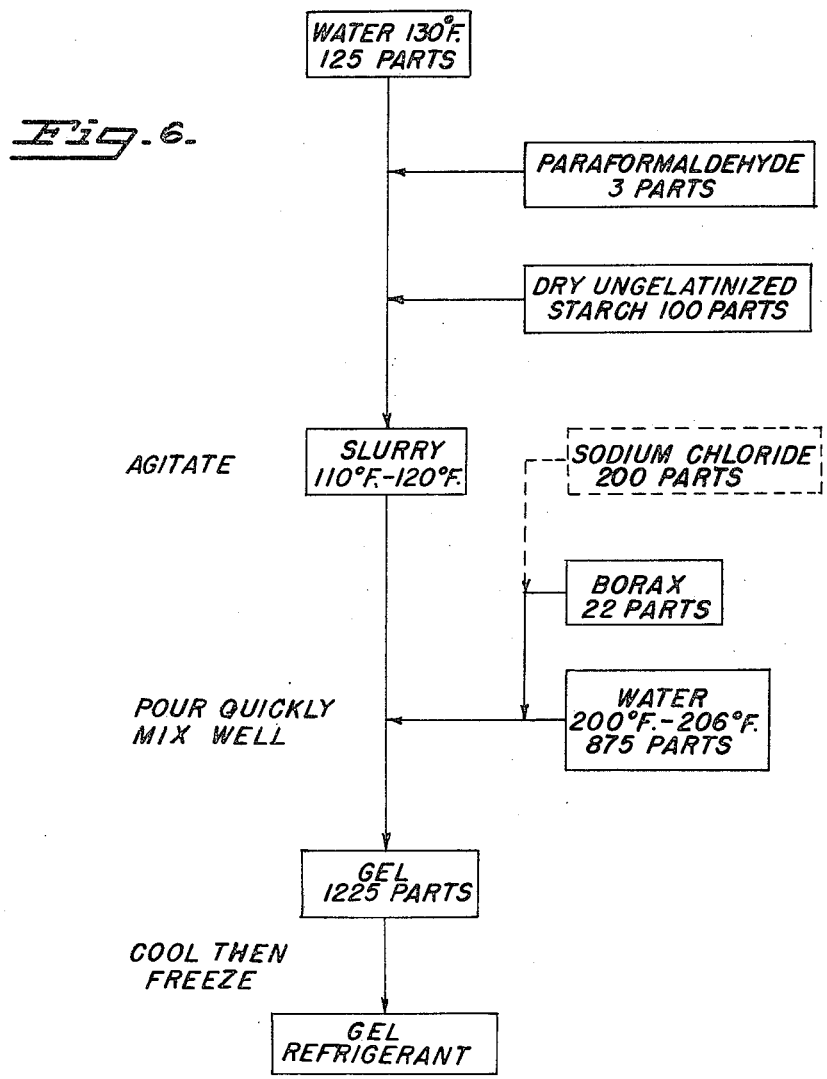

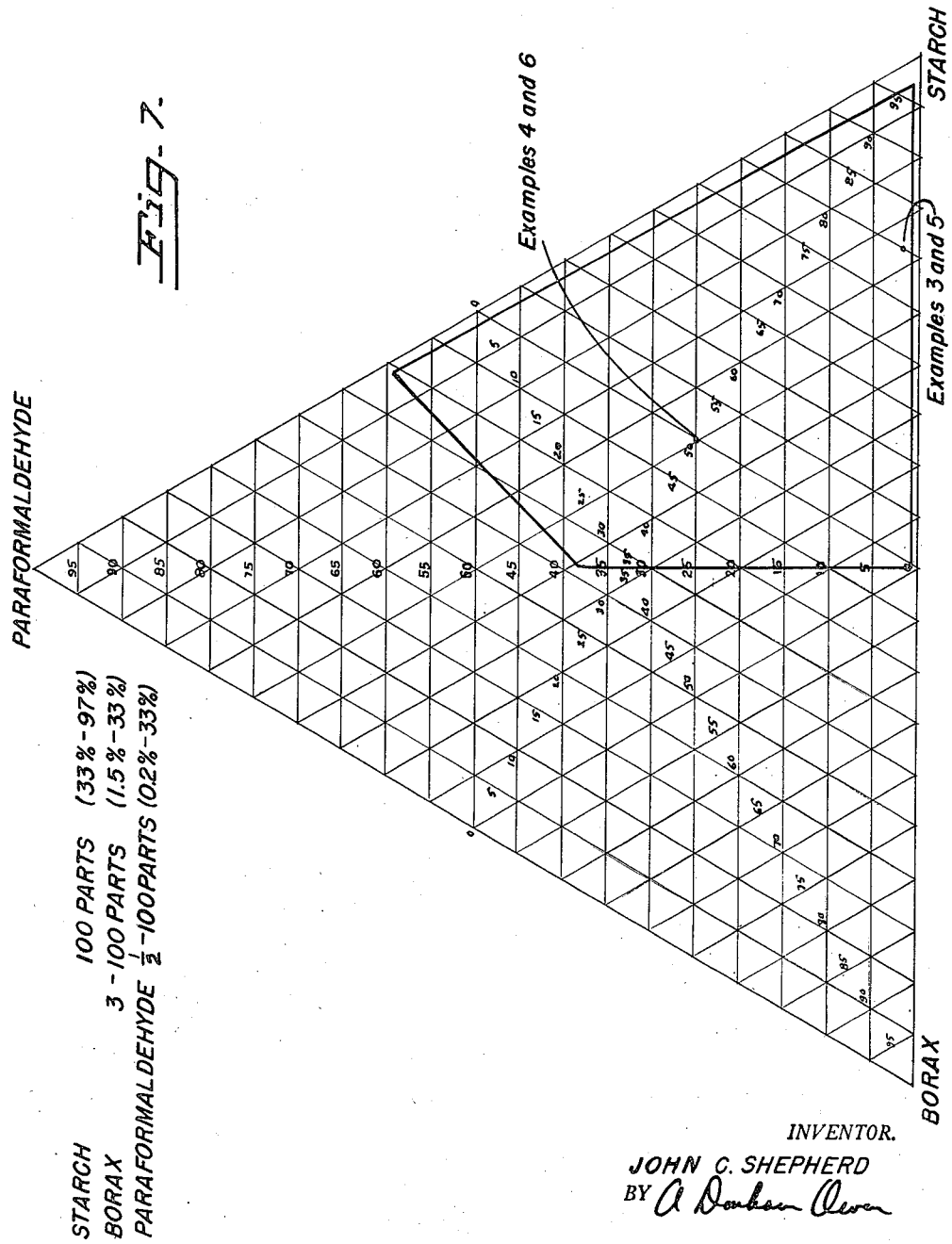

United States Patent Office 2,800,454
Patented July 23, 1957

2,800,454

GEL REFRIGERANT AND A METHOD OF MAKING SAME

John C. Shepherd, Monrovia, Calif.

Application June 22, 1953, Serial No. 363,155

23 Claims. (Cl. 252—70)

This invention relates to an improved gel refrigerant which does not liquefy at ordinary room temperatures. It also relates to a method for manufacturing the new gel refrigerant. This application is a continuation-in-part of application Serial Number 217,811, filed March 27, 1951, now abandoned.

For many purposes water ice is an undesirable refrigerant solely because it melts into water at the comparatively low temperature of 32° F. Once it has turned to water, it flows away from the goods so that it is no longer present to refrigerate them; still worse, it often spoils the goods being refrigerated and damages or destroys the shipping container in which the goods were packed. Except for this property of melting, water ice is an excellent refrigerant, because it has a very high specific heat and a very high heat of fusion.

I have solved the problem caused by the melting of water ice and have devised a refrigerant that incorporates water along with its attendant advantages, but that does not liquefy when its temperature exceeds its "freezing" or "fusion" or "eutectic" point, i. e. that temperature where a quantity of heat energy is transferred without any resultant change in temperature, due to a "change of state." The quantity of heat consumed during this change in state is commonly known as the "heat of fusion." My refrigerant is a new type of starch gel that contains, in addition to water and starch, other ingredients that cause it to have properties not found in prior gels. The gels heretofore known were in some manner affected by freezing, so that they leaked or ran water when the temperature was again raised. Such prior art gel refrigerants as the one shown in Gilchrist's United States Patent No. 2,490,074 were called "slow melting ices," but they did melt and therefore failed to solve the problem. My gel refrigerant holds the water and does not melt or run water after it has been frozen and then raised to room temperature or even to higher temperatures.

The moisture in my improved refrigerant may be sufficient to prevent dehydration of a surface with which it is in contact, so that it is well adapted to preserve perishable commodities. Moreover, it differs from prior art refrigerant materials in that it may be molded around a commodity before it is frozen, i. e. somewhat like molding clay. This enables it to protect the commodity from dehydration when both are frozen and during any period they may be held in cold storage.

Another advantage possessed by my new refrigerant and not by prior art gels is that, when it is frozen, it may be shaved or cut into small pieces like crushed water ice. This makes it easy to pack and easy to convey through conduits, and also makes possible its all-round efficient use as a refrigerant. This gel ice will not give up its water when it warms up to ordinary room temperature. Instead, the small pieces of gel that come in contact tend to reform together into a mass and may be again handled in large pieces.

My new gel refrigerant may be treated so as to last indefinitely, or it may be treated so that, after a suitable period of time, it will melt or liquefy. With the latter type of treatment the used material may be placed at the intake end of a sewage system, and it will dispose of itself.

The composition of my gel refrigerant may be varied in its manufacture to give it different "freezing points," so that its properties can be adapted to a particular use. Characteristics such as point of fusion, heat of fusion, and toughness may be affected and adjusted to the most desirable temperature range for the material being refrigerated.

Other objects and advantages of the invention will become apparent from the following detailed description thereof, in accordance with 35 U. S. C. 112, including several examples of formulas and several examples of ways in which the gel refrigerant may be used. The formulas and uses are, however, only examples, and are not to be thought of as narrowly limiting the invention beyond the scope of the appended claims.

In the drawings:

Fig. 1 is a graph showing the proportions of starch, water, and borax capable of forming a non-leaking starch gel.

Fig. 2 is a graph similar to Fig. 1 showing the proportions of starch, water and a combination of borax and paraformaldehyde necessary to form a gel refrigerant.

Fig. 3 is a flow sheet diagrammatically illustrating a process of manufacturing the starch gel refrigerant of this invention.

Fig. 4 is a view in elevation and in section diagrammatically illustrating the use of gel slices in suitable packaging according to Example 11 below.

Fig. 5 is a view in elevation illustrating the packing of fish in accordance with Example 12 below.

Fig. 6 is a flow sheet diagrammatically illustrating another process of manufacturing the refrigerant of this invention.

Fig. 7 is a graph showing the proportions of starch, borax, and paraformaldehyde which may be used in practicing this invention.

Before discussing any particular examples, let me first explain what I mean by a "gel." One text defines a gel as "a mixture, one component of which is a fluid, homogeneous down to colloidal dimensions, capable of resisting a finite shearing force." (Industrial Chemistry of Colloidal and Amorphous Materials, by Lewis, Squires, and Broughton, Macmillan, New York, 1942, page 225). My gel refrigerant appears to come under this definition.

The same text says (page 219) " . . . The characteristics of jellies have long been a subject of study and dispute." For that reason, I shall not attempt to advance any theoretical explanation of what makes my substance work. I have discovered that it does work, and I have discovered the ingredients, proportions, and processing that produce a satisfactory gel, and that enable manipulation of its qualities. So far as theory is concerned, the same text says (page 229): "The only tenable explanation of the properties of gels in general seems to be the assumption of a card-house or brush-heap structure of solid or quasi-solid particles immersed in the fluid, the particles being bonded at points of contact sufficiently to prevent disintegration of the structure. The particles of the framework may be suspended solids of colloidal dimensions, or long, inter-tangled molecular chains, or in limiting cases, even emulsified droplets. The bonds at points of contact may be due in some cases to nothing more than interparticle friction, while in others the forces are undoubtedly of the partial valence or the primary valence types. Despite the diversities in properties resulting from these possible differences in structure, it is felt that the picture here outlined gives the most satisfactory insight today available into the behavior of gels."

A gel is unlike other substances in that it does not change from a solid to a liquid at the point of fusion. Instead it changes from a semi-solid or flexible solid to a true or rigid solid.

My gel-refrigerant is a semi-solid or flexible solid at room temperatures, with its physical apearance superficially resembling gelatine desserts and fruit jellies, and it can then be bent, moulded and reshaped. When it is frozen into a solid, it is as stiff as ice, though somewhat less brittle, and it will ring when struck sharply with a hammer. When gel in the semi-solid state is similarly struck, the sound is a plunk or thump somewhat like the sound given by a melon, even if there is a stiff crust of solid gel around the outside. The striking is therefore a good test of the state of the gel.

Not all gels can be used to make refrigerants because most gels will leak water after they have been frozen and cooled. The present invention has solved the problem of providing a gel refrigerant which does not leak water and, which, in certain forms, can be used repeatedly over a long period of time, being refrozen and rethawed without leaking water.

THE GEL REFRIGERANT BROADLY CONSIDERED

The product of my invention is a starch-borax gel lying within a certain range of proportions. It may contain only starch, borax, and water or it may have other ingredients which vary the properties of the gel.

Any suitable starch may be used, including corn starch, potato starch and wheat starch. The starch may be pregelatinized, but this is not necessary. The present application relates to starch that is either ungelatinized or pregelatinized prior to its incorporation into the refrigerant of this invention, and the process or method by which the gel is produced from ungelatinized starch as distinguished from the process or method by which the gel is produced from pregelatinized starch, forms the subject matter of copending application, Serial No. 363,186, filed June 22, 1953. The two types of starch act differently, combine with water and with borax and water in different proportions, are combined into a gel by different processes, and otherwise differ, so that this separation will clarify the use and properties of each starch when used in the respective methods or processes.

Pregelatinized starch has been specified in many of the examples below, mainly because it can be mixed with water at room temperature; however, ungelatinized starch may be used in a manner which will allow an increase of water without a proportional increase in the starch or borax. In using ungelatinized starch the mixture must be heated above the gelatinization point of the starch used, which is usually 160° F. to 200° F.; then it must be cooled before it is handled.

If pregelatinized starch is used, the characteristics of the gel-refrigerant depend somewhat on the original gelatinization, because gels exhibit the phenomenon of "memory." Apparently the "card house" or "brush heap" structure referred to above in the text quotation has something to do with this. At any rate, the amount of water needed will depend on the original constitution of the pregelatinized starch, and so there will be inevitable variations of the formula. However, my gel refrigerant will give satisfactory results so long as it is adapted to the materials being used.

The ratio of starch to water is important for the properties of the gel can be varied by varying this ratio. It depends partly on the original processing, when pregelatinized starch is used, but there are other factors, too. In Examples 1, 4 and 6 below, the ratio is 1 part of starch to 8 parts of water. This ratio has been set forth as an illustration of a ratio which will prevent water from running off when the refrigerant is subjected to all the extreme treatments involved in handling many times; e. g., freezing, cutting or grinding, thawing, raising to high temperatures, and in some cases refreezing, with the whole process repeated over again. Should more favorable conditions be encountered or should a thinner material be desirable, then the ratio may be increased to 1 part of starch to about 20 parts of water. On the other hand, if the material is too soft or if its yield point is too low, then a higher ratio of starch to water will give a stronger material, but will reduce the specific heat and the heat of fusion.

Two or more kinds of starches may be mixed together, and sometimes this will affect the ratio of starch to water. For example, suppose that half the starch in the gel is pregelatinized cornstarch and the other half is pregelatinized wheat starch. Typical pregelatinized cornstarch calls for a ratio of one part starch to about eight parts of water. Typical pregelatinized wheat starch calls for about a 1 to 10 ratio. A gel made up as a mixture of the two will hold water at about a 1 to 9 ratio.

THE IMPORTANCE OF BORAX

Due to the inclusion of borax into the mixture, this refrigerant will not melt when it is unfrozen and heated to room temperatures, but will remain in the semi-solid state for a predetermined period of time. The borax apparently performs three functions:

(1) It causes the mixture to set faster and to a more rigid consistency on a smaller amount of starch per water, thus making it possible to get a higher specific heat and heat of fusion. Only a small amount of borax is needed to get this effect, and in Example 1 this particular effect can be obtained with as little as a fourth of the amount specified.

(2) The addition of a large quantity of borax apparently prevents the breakdown that ordinarily resulted when prior art gels were frozen and then unfrozen. When thawed they became spongy and melted or leaked water. Should the borax be omitted from the formula in Example 1, a gel will still form and it can be frozen, but when it is again heated above the freezing point, about half its water may be readily squeezed out. When borax is used as specified, no water will run out, nor can any be squeezed out after the gel has been returned to room temperature. If a small amount of leakage is not undesirable or if the material is not subject to being squeezed on returning to room temperature, the amount of borax specified in Example 1 may be reduced by about half.

(3) After starch gel becomes warm, it tends to break down into a slimy liquid, probably a sol. This is not mere leaking or loss of water, it is a rupture of the gel state. The addition of borax alone will not prevent this breakdown, but it will delay it, so that it may take place only after a substantial and fairly predictable period of time. When the amount of borax specified in Example 1 is used, the mixture will remain in its semi-solid state for about four days after it has become warm, long enough for most shipments. If only half the amount specified in Example 1 is used, the breakdown will begin after about thirty-six hours. If twice the amount specified in Example 1 is used, the breakdown will not begin until after about six to eight days, under average conditions. In any event, when the mixture has served its purpose, it may be thrown into a suitable container having an outlet into a sewage system. The gel gradually dissipates into a slimy liquid that runs off into the sewage. If a permanent gel is wanted, formaldehyde or another aldehyde should be added, as in Examples 5 and 6 below. Then the gel may be made to last indefinitely, but it cannot be disposed of so easily.

INGREDIENTS AFFECTING THE FREEZING POINT

Sodium chloride, other salts, and other substances may be used to change the freezing point of the gel refrigerant. The refrigeration expert knows the different substances that will do this and how they act. In Examples 7 and 8, such mixtures are shown in detail. Examples could be multiplied, but this illustrates that the freezing point of the gel can be considerably varied by the addition of various other ingredients.

Specific examples of starch-borax gels and their applications will now be considered.

*Example 1*

| | Parts by weight |
|---|---|
| Starch | 100 |
| Borax | 20 |
| Hot water | 1200 |

Either the starch and borax are added dry to the water simultaneously, or else the borax is added first. The water may then be heated to about 200° F. to gelatinize the starch. The process shown in Fig. 3 is a practical method of obtaining this product.

The gel refrigerant of Example 1 has a specific heat of about .93 and a heat of fusion of about 131 at about 29° F. Therefore starting with the material at 70° F. approximately 170 B. t. u. per pound must be removed to freeze it. This compares with a removal of about 185 B. t. u. per pound to cold water from 70° F. to 28° F. including freezing it.

As Fig. 1 shows, the proportions of starch-borax and water may be varied. However, in order to be satisfactory, they will lie within the following ranges, which are also those shown in Fig. 1:

Ungelatinized starch, 100 parts
Water between 300 parts and 1800 parts
Borax between 5 parts and 100 parts

*Example 2.—A starch-borax gel refrigerant*

| | Parts by weight |
|---|---|
| Pregelatinized starch (e. g. "Amijel") | 4 |
| Borax | 1 |
| Water (at approximately room temp.) | 32 |

The process of compounding the refrigerant of Example 2, above, is claimed, illustrated and disclosed, in Fig. 1 and, as Example 1, in my co-pending application, identified above.

Once jelled, the mixture may be removed from the mixing container by turning the container over and shaking or tapping it. The gel will fall away from the walls of the container and slip out. The mixture may also be removed by a shovel or other suitable implement or with the hands.

The semi-solid gel may then be placed under suitable refrigeration in a single large mass, in chunks, or in a suitable container such as the tapered ice cans used in water-ice plants. The mixture of Example 2 will solidify at approximately 30° F. Care should be taken to be sure the material is completely frozen. Its appearance and feel are sometimes deceiving, because it may appear to be solid when only its outer surface is frozen and the interior is still semi-solid. A good test is to strike the material a sharp blow with a hammer; if the mixture is solid, the blow will cause a ringing sound. If there is no ring, the sound will resemble a thump on a melon, and this means that the gel is not completely frozen.

The gel refrigerant of Example 2 has a specific heat of about .90 and a heat of fusion of about 125. Therefore, starting with the material at 70° F., approximately 161 B. t. u. per pound must be removed to freeze it. This compares with a removal of about 183 B. t. u. per pound to cool water from 70° F. to 30° F., including freezing it.

Expressed percentage-wise by weight, this means about 5% to 25% of the previously ungelatinized starch, about 0.25% to 20% borax, and about .60% to 95% water. In other words, the borax is present in quantities of about 5% to 100% of the starch, and there is about 3 to 18 times as much water as starch, by weight.

*Example 3*

The starch gel described in Examples 1 and 2 is satisfactory where the product is to be frozen quickly, but where the freezing is done slowly, the following formula is preferable:

| | Parts |
|---|---|
| Ungelatinized starch | 100 |
| Water | 800 |
| Borax | 20 |

The mixing may be as above in Example 1 (see Fig. 3).

The ranges of proportions of this type of mixture which could be slowly frozen are as follows:

| | Parts |
|---|---|
| Ungelatinized starch | 100 |
| Water | 300 to 1500 |
| Borax | 13 to 100 |

*Example 4*

In some instances (e. g. such as in Example 12 below) it may be desirable to refreeze my gel refrigerant many times. The following formula is suitable for such use:

| | Parts by weight |
|---|---|
| Pregelatinized starch (e. g. "Amijel") | 5 |
| Borax | 3 |
| Water | 40 |

This mixture may be made by either of the methods described in Example 1 of my copending application, identified above. The gel refrigerant will perform similarly, except it may be refrozen more times. Its specific heat is approximately .88 and its heat of fusion approximately 120.

*Example 5.—A longer lasting gel*

The lasting properties of the gel refrigerant, i. e., the factors which keep it from melting or turning it into the slimy liquid in paragraph 3 in the section called "The Importance of Borax," may be enhanced by the addition of formaldehyde, paraformaldehyde or some other aldehyde. Paraformaldehyde comes in a dry powder whereas formaldehyde comes in a 40% solution in water and alcohol. The paraformaldehyde corresponds to 91% pure formaldehyde and therefore less is necessary than is the formaldehyde solution. Formaldehyde also acts as a preservative agent to prevent the formation of molds which disfigure the gel. Also other mold inhibiting agents could be used for this purpose, but not for the other effects brought by aldehydes.

A very good formula is as follows:

| | Parts by weight |
|---|---|
| Ungelatinized starch | 100 |
| Water | 1,000 |
| Borax | 22 |
| Paraformaldehyde | 3 |

The mixing may be done as shown in Fig. 6, disregarding the dotted-line box. The use of formaldehyde or paraformaldehyde, which amounts to the same thing, so long as corrections are made in the proportions, make it possible to greatly extend the range of workable materials. These ranges are given in Figure 2 as follows:

| | | |
|---|---|---|
| Ungelatinized starch | parts by weight | 100 |
| Water | parts | 300 to 2,000 |
| Borax | do | 3 to 100 |
| Paraformaldehyde | do | ½ to 100 |

Expressed in percentages, by weight the proportions are about 4% to 25% of previously ungelatinized starch, about 0.2% to 20% borax, about 0.02% to 20% paraformaldehyde, and about 60% to 96% water.

One peculiar phenomenon occurs with the use of formaldehyde or paraformaldehyde, and that is, that if the amount of borax is kept low and if the amount of paraformaldehyde is high relative to borax (e. g., using 3 parts borax and 100 parts formaldehyde) in order to hold a large amount (e. g., about 1600 parts of water per 100 parts of starch), then if the gel is frozen immediately after it is manufactured, it will not hold up satisfactorily. This difficulty can be overcome by holding the gel at a temperature above freezing for a period of about 24 hours or more after its manufacture. This waiting is not necessary where a large quantity of borax is used, whether or not the amount of aldehyde is reduced.

The addition to Example 4 of 1/17 of one part of formaldehyde to the water before the starch is added will keep the change from taking place for periods of 1000 hours or longer after the gel thaws to its semi-solid state. The addition of greater amounts of formaldehyde may prevent the rupture of the gel state from ever occurring, as in Examples 7 and 8 below.

*Example 6.—A very durable gel for difficult conditions*

The gels listed above can last for a long time. Using Example 5, a very durable gel may be made which may be frozen hundreds of times without leaking water when it thaws. However, fast freezing and fast thawing are easier on the gels and do not cause them to leak water so readily as where the gel is frozen slowly and thawed slowly. For extremes of slow freezing and slow thawing, the following has been proven satisfactory.

*Example 6*

Ungelatinized starch, 100 parts by weight
    Water, 600 parts
    Borax, 50 parts
    Paraformaldehyde, 50 parts (or formaldehyde approximately 120 parts)

Fig. 6 diagrammatically shows a preferred method of compounding this mixture. The paraformaldehyde and starch are thoroughly mixed into a small amount of water until they make a thin slurry, preferably at a temperature between about 110° and 130° F.

The remainder of the water is heated separately until the water boils briskly. Then it is removed from the heat, borax is added, and the thin solution of starch and paraformaldehyde is quickly poured into the boiling water and the whole is vigorously agitated. Where necessary, the mixture will be heated to attain the gelatinization temperature. Quick agitation prevents parts of the mixture from settling before the remainder is added, and keeps the mixture even. The gel is then allowed to cool and may then be frozen.

For illustrative purposes, ungelatinized starch has been specified, although pregelatinized starch could have been used, as in Examples 2 and 4. The borax may be reduced to about 5% of the weight of the starch in some cases, if that is desired, so long as enough formaldehyde is used.

The mixtures in Example 6 have some different properties from the gel refrigerant of Examples 1 to 4. They may be refrozen many times, and if protected from dehydration will last for a considerable period of time. Refrigerants made according to this example have been used periodically for nine months without any noticeable change taking place. This gel does not have as strong a tendency to reform into a mass as the mixtures in Examples 1 to 5. Fig. 7 shows the proportions between starch, paraformaldehyde, and borax that may be used.

*Example 7.—A gel refrigerant with a lower freezing point*

Sometimes it is desirable to have the "freezing" or "eutectic" point of the gel lowered. The following formula is illustrative:

| | |
|---|---|
| Ungelatinized starch _____parts by weight__ | 100 |
| Water _____parts__ | 1000 |
| Borax _____do____ | 22 |
| Paraformaldehyde _____do____ | 3 |
| Sodium chloride_____do____ | 200 |

The sodium chloride may be added either to the starch or to the water, so long as it is well mixed in. The full process used in mixing is shown in Fig. 6. Then the mixture is prepared and processed as in the previous example which uses ungelatinized starch. The liquid part of this mixture takes on the freezing characteristics of brine solution with a freezing point of the mixture at about −8° F. In place of sodium chloride, other substances may be used, so long as they are soluble, do not react with the starch, are not volatile, and are not destroyed by the heating necessary when mixing the ungelatinized starch. For example: Calcium chloride, sodium sulfate, potassium nitrate, potassium chloride, sodium carbonate and other soluble metallic salts may be used as may other well-known eutectic depressants. The metallic salt or depressants may be added to the starch-borax gel of Example 1 as well as to the gel which included the formaldehyde. The amount of such matter to be added depends upon its solubility and upon the desired eutectic point, but extends from zero to saturation.

*Example 8.—A gel refrigerant with a lower freezing point*

The following formula is illustrative for producing the gel of Example 7, above, from pregelatinized starch.

| | Parts by weight |
|---|---|
| Pregelatinized starch ("Amijel")_____ | 5 |
| Borax _____ | 3 |
| Sodium chloride_____ | 6 |
| Water _____ | 30 |

The sodium chloride may be added to either the starch or the water, so long as it is well mixed in. Then the mixture is prepared and processed according to either of the methods set forth in Example 1 of my co-pending application, identified above. The liquid part of this mixture in combination with the sodium chloride takes on the freezing characteristic of a brine solution, with a freezing point for the mixture of about −6° to about −10° or even lower.

Sodium chloride may also be added to the formaldehyde mixture of Example 6, preferably reducing the amount of water in order to get characteristics like those of Example 8.

The formulas set forth in Examples 1 to 8 will not melt at temperatures under 100° F. and they may be used for most applications up to 120° F. They do not melt until much higher temperatures are reached, but they get sticky at temperatures much above 120° F.

*Example 9.—Serum packing mixture*

The following formula is an example of a starch-borax gel that may be used where a less rigid consistency is needed (see Example 10 below).

| | Parts by weight |
|---|---|
| Ungelatinized potato starch _____ | 2 |
| Borax _____ | 1 |
| Paraformaldehyde _____ | 1 |
| Water _____ | 40 |

A good method of compounding this formula is similar to the method shown in Fig. 3. The borax, paraformaldehyde, and starch may be mixed into 6 parts of water, forming a thin solution or suspension that is preferably adjusted to about 125° F. to 130° F. The remaining 34 parts of water are boiled separately, removed from the heat, and the thin mixture added quickly, with vigorous agitation. The mixture gels and is allowed to cool. Then it may be frozen and ground, if desired.

It has a larger percentage of water than previous examples and this causes it to have a higher specific heat of approximately 0.95 and a higher heat of fusion of about 134, The following examples are applications of the above formulas.

*Example 10.—Serum packing*

It is often necessary or desirable to keep blood and some serums refrigerated during shipment. The blood or serum is conventionally contained in small glass bottles which are well packed in insulated containers of fibre board or corrugated cardboard. Prior art refrigerants could not be used, because there was no practical way of using it that would not add too much to the cost.

When using the thin refrigerant of Example 9, it will be desirable to wax the cardboard container or line it with water repellant materials. If the container has holes in it substantially larger than ice-pick holes, the amount of water used in the formula of Example 9 should be reduced to about 36 parts, or one of the formulas in Examples 1 to 8 may be used.

Preferably the refrigerant of Example 9 is frozen, and ground or shaved. Then it is packed in between adjacent serum bottles and around them in such a manner that each bottle is separated from the other bottles and from the container walls. The free spaces in the box may be completely filled with the frozen gel-refrigerant. The package will then retain the temperature of the serum at a low level for a considerable period of time.

The packing of the frozen gel-refrigerant will protect the bottles from breakage during shipment and handling. Even after the gel thaws it will protect the serum bottles and will keep them cool until the gel absorbs enough heat to raise it to the level of the storage chamber or shipping car. At all times after it has thawed, the gel is a semi-solid rather than a liquid, and it will therefore support and protect the bottles from breakage due to shock or vibration, whereas water ice would run off or would stand without protecting the bottles at all. Depending on the period of time and the temperature prevailing in the transporting vehicle during shipment, enough gel-refrigerant can be used to prevent heat from damaging the serum or blood.

*Example 11.—Preventing frozen food from degenerating*

My invention may be used in many applications where regular water ice and other refrigerants heretofore known cannot be used. For example, it may be used to keep frozen food from degenerating.

Each time frozen food is handled, whether by the producer, the warehouse, the distributor, or the ultimate consumer, it is subjected to temperatures higher than the optimum level, and it is subjected to a fluctuation in temperature. Such fluctuation causes deterioration of the food, whenever, it rises above a certain temperature, whether or not the food completely thaws out, because large ice crystals build up that eevntually rupture the cell walls of the food product. As a result, the food may become undesirably soft, and the package may even drip water.

My invention has solved this problem. Fig. 4 shows a package of frozen food prepared according to my invention. Gel may be prepared according to the formulas of Examples 7 and 8, frozen to about —10° F., and cut into slices about 3½ inches wide by 5 inches long by ½ inch thick. Each slice 10 will fit into a standard frozen food package 11. If the same net weight of food 12 is to be packaged, the package 11 will be about ½ inch taller than where my invention is not employed. The food (e. g. frozen peas) may be placed in the bottom of the container 11, a thin piece of wax paper 13 placed over the food, and the slice 10 of my gel refrigerant placed over that. The container 11 may then be closed. About two dozen containers 11 may be packaged into a corrugated container, as in current practice.

It takes about 108 B. t. u. to heat each pound of the gel of Examples 7 and 8 from about —6° F. to about 16° F., approximately 90% being expanded in the "heat of fusion" at about —6° F. The gel slice 10 of the dimensions described weighs about half a pound; so it will take about 54 B. t. u., to heat it over this range.

Let us suppose that this particular food 12 will be damaged, if and only if, its temperature exceeds 16° F. at any time and that fluctuation below this temperature will not hurt it. Such is the case with many frozen foods. Before the temperature can get above 16° F., the slice 10 of gel will have to absorb 54 B. t. u., and in each case of two dozen packages 11, the gel will have to absorb about 1296 B. t. u. before the food can be damaged. Moreover, because of the fact that the case will be resubjected to low temperatures after each handling, it can absorb 1296 B. t. u. each time it is handled without damaging the food 12. For example, the case of gel and frozen food is subjected to temperatures above 16° F. while it is removed from storage and placed in a railroad refrigerator car. However, after the car has been loaded and is closed, the refrigerator system freezes the gel again. When the car is unloaded and the case moved to a warehouse, the gel protects the food until the case is again in a low-temperature storage chamber. This may happen repeatedly, every point of handling being followed by cold storage and recooling of the gel. In each instance 90% of the gel's B. t. u. value could be first taken on and then given off at —6° F. The gel is not damaged by being heated and refrozen, and the food is protected. Should this fluctuation happen seven times during the handling of the case, between the factory and the retail store, then the gel would have protected the commodity by absorbing a total of about 9072 B. t. u. This is equivalent to what about 63 pounds of water ice absorbs while melting and it is done by only 12 pounds of gel. Furthermore, water ice could not be used, because it would melt and run off.

*Example 12.—Protecting fish from heat and from dehydration during freezing*

The gel may be used to cool commodities quickly, keep them cool in transit, and at the same time prevent them from becoming dehydrated. This will be illustrated by describing a process for preparing fish.

Gel, which may be made according to the formulas in Examples 1, 2 or 6, is frozen, cut into chunks, and ground into small pieces. Referring to Fig. 5, a suitable piece of wrapping paper 20 is placed on a table 21 and a one-inch thick layer 22 of the ground frozen gel is placed on the paper 20 over an area larger than the fish. The fish 23 is placed on this bottom layer 22, and more ground frozen gel 24 is packed around and over the fresh fish 23. Care is taken to cover the fish completely, but the largest amount of frozen gel is preferably placed on the top layer 24, because heat tends to rise. If desired, the open cavities of the fish may also be filled with the frozen gel. The fish may now be wrapped and the package placed in a corrugated box for shipment, along with other similar packages. An important point is that a corrugated box may be used with my gel ice, while it could not be used with water ice. Moreover, the coagulum stays properly packed until it is removed.

The gel will quickly lower the temperature of the fish, and it will protect it until the gel is heated to the critical high temperature of the fish, which is about 50° F. The gel absorbs heat not only at its "point of fusion" of the water, but also at temperatures above and below that.

My gel refrigerant also prevents the fish from dehydrating because the high-water-content coagulum surrounds the fish.

*Example 13—Freezing fish*

My new gel or coagulum may be used to freeze fish, protect them from freezer burn during later cold storage, keep them frozen in transit and at the same time protect them from dehydration even after the whole mass has completely thawed.

The gel formula set forth in Examples 7, 8 may be used. After the coagulum has been frozen, cut into pieces and ground, it is applied in the same manner as in Example 12, but this time the wrapped fish is not placed immediately in the shipping container but is first placed in a quick freezer and allowed to remain there until the whole package is well-frozen. If the package is placed on freezer plates, the coagulum starts to freeze the fish from the top while the cold plates freeze it from the bottom; then after the fish and gel are at the same temperature level, the gel which absorbed heat from the fish will be refrozen. The fish cannot suffer "freezer burn" during this operation because it is covered with the moist gel. Moreover the package may be retained in a cold storage room for a considerable time without suffering either freezer burn or dehydration. The gel of Examples 7, 8 allows the package to be held in cold storage at —10° F.

The frozen package may be packed and shipped in a corrugated paper container. It will be kept frozen until the coagulum has absorbed its heat of fusion, and during all this time it will protect the fish from dehydration.

*Example 14—Another example of freezing fish*

Here gel made according to the formula set forth in Examples 7 and 8 will again be used. Sodium chloride is used to keep the gel from freezing above —6° F. because in the method about to be set forth, the gel is not to interfere with the quick freezing of the fish. The procedure of this example protects the fish from dehydration and from unfavorable temperatures; it also saves time and eliminates a number of operations, reducing the cost and requiring less equipment.

The unfrozen gel at about room temperature is placed near the packing table 21 (Fig. 5). A suitable piece of paper 20 is placed on the packing table 21. A layer or slice 22 of unfrozen gel is placed on the paper, the fish 23 placed on it, and then more of the unfrozen gel 24 is molded around it. The paper is then folded over and taped or tied, and the package is placed in the quick freezer. Then the temperature is lowered below the freezing point of the fish, but at a point above the freezing point of the gel. When the package is placed on refrigerator coils or between, the gel helps to conduct the heat from the fish to the coils better than air does. After the fish has been frozen, the gel may be left unfrozen or it may be frozen, if desired, and no freezer burn or dehydration can take place. When the package is completely solid, it may be removed, packed, and shipped. Because the coagulum was not frozen in advance, there was less labor and no cutting or grinding equipment was needed.

The above examples could be multiplied many times, but they are already sufficient to illustrate the principles of the invention.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A refrigerant having the quality of retaining its moisture after it has been frozen and then thawed, consisting essentially of a homogeneous gel of water, previously ungelatinized starch, and borax, in the proportions of 100 parts of starch, between 5 and 100 parts of borax, and between 300 and 1,800 parts of water, by weight, the mixture being gelled by heating it to the gelling temperature for starch in water and holding it there for the necessary period of time.

2. The refrigerant of claim 1 having a eutectic depressant homogeneously dispersed therein in quantities sufficient to lower the eutectic point to a desired level.

3. A refrigerant having the quality of retaining its moisture after it has been frozen and then thawed, consisting essentially of a homogeneous gel of water, previously ungelatinized starch, borax, and paraformaldehyde, in proportions of 100 parts of starch, between 3 and 100 parts of borax, between one half and 100 parts of paraformaldehyde, and between 300 and 2,000 parts of water, by weight, gelled by heating the mixture to approximately 200° F. until the gel forms.

4. The gel of claim 3 having in addition a soluble mineral salt in quantities sufficient to change the freezing point of the water to a desired value.

5. A non-leaking refrigerant material consisting of a gel composed of approximately 100 parts of previously ungelatinized starch, approximately 20 parts of borax, and approximately 1,200 parts of water, gelled by heating the mixture to approximately 200° F. for enough time to form the gel.

6. A refrigerant material that holds its water after being frozen and thawed, even when the freezing and thawing is done slowly, consisting of a gell composed of approximately 100 parts of previously ungelatinized starch, approximately 20 parts of borax, and approximately 800 parts of water, gelled by heating the mixture to approximately 200° F. for enough time to form the gel.

7. A long lasting refrigerant material that does not leak after being frozen and thawed repeatedly, consisting of a gel composed of approximately 100 parts of previously ungelatinized starch, approximately 22 parts of borax, approximately 3 parts of paraformaldehyde, and approximately 1,000 parts of water, gelled by heating the mixture to approximately 200° F. for enough time to form the gel.

8. The refrigerant of claim 7 having in addition up to approximately 200 parts of the chloride of the metal chosen from group consisting of sodium and potassium, applied before gelling the mixture.

9. A method of making a starch gel that will hold its water without leaking comprising dispersing borax in water, dispersing previously ungelatinized starch in said water, and then heating said water so as to gel said starch, the borax being present in quantities between 5% and 100% of the starch, by weight, and the water in quantities between 3 and 18 times that of the starch by weight.

10. The method of claim 9 in which dry borax is mixed with dry starch and the dry mixture is added to hot water promptly and in a steady stream while agitating the hot water until the gel begins to set, the temperature of the hot water being approximately 200° F.

11. The method of claim 9 in which borax is first dissolved in hot water and then the starch is added and gelled at the aforesaid 200° F. temperature.

12. A method of making an irreversible starch gel that will remain gelatinized indefinitely comprising the steps of mixing together ungelatinized starch, water, and formaldehyde to form a thin slurry at a temperature of approximately 115° to 125° F., the starch being present in approximately 100 parts, the borax approximately 20 parts, and water approximately 150 parts at 130° F., and then adding hot water between 195° F. and 206° F. in approximately 1,050 parts, forming a mixture of 1,320 parts, which at that temperature will cause the starch to gel.

13. A gel refrigerant that holds its water upon being frozen and thawed, consisting essentially of 100 parts of pregelatinized starch, between 300 and 1000 parts of water, and between 13 and 100 parts of borax.

14. A gel refrigerant that will not leak water upon being frozen and thawed, consisting essentially of 100 parts of pregelatinized starch, between 300 and 1200 parts of water, between 3 and 100 parts of borax, and between 1 part and 100 parts of paraformaldehyde.

15. A gel refrigerant that holds its water upon being frozen and thawed, consisting of 100 parts of pregelatinized starch, between 300 and 1000 parts of water, between 13 and 100 parts of borax, and a soluble mineral salt in quantities up to saturation in sufficient parts to lower the freezing point of said gel refrigerant to a desired value.

16. The refrigerant of claim 15 in which said salt is a chloride of an alkaline metal.

17. A gel refrigerant, consisting of 100 parts of pregelatinized starch, between 300 and 1200 parts of water, between 3 and 100 parts of borax, between 1 part and 100 parts of formaldehyde, and a soluble mineral salt in quantities up to saturation in sufficient parts to lower the freezing point of said gel refrigerant to a desired value.

18. The refrigerant of claim 17 in which said salt is an alkaline metal salt of a halogen acid.

19. A gel refrigerant capable of retaining its water upon being frozen slowly and thawed slowly, consisting of 100 parts of pregelatinized starch, between 300 and 900 parts of water, and between 13 and 100 parts of borax.

20. A gel refrigerant capable of retaining its water upon being frozen relatively slowly and thawed relatively slowly, consisting of 100 parts of pregelatinized starch, between 300 and 1000 parts of water, between 5 and 100 parts of borax, and between 1 and 100 parts of paraformaldehyde.

21. A non-leaking gel refrigerant, consisting essentially of approximately 100 parts of pregelatinized starch, approximately 25 parts of borax, and approximately 800 parts of water.

22. A gel refrigerant that does not leak water upon being frozen and thawed, even when the freezing and thawing are done slowly, consisting essentially of approximately 100 parts of pregelatinized starch, approximately 60 parts of borax, and approximately 800 parts of water.

23. A gel refrigerant that holds its water even after repeatedly being frozen and thawed, consisting essentially of approximately 100 parts of pregelatinized starch, approximately 25 parts of borax, approximately 3 parts of paraformaldehyde, and approximately 800 parts of water.

References Cited in the file of this patent

UNITED STATES PATENTS

| Number | Name | Date |
|---|---|---|
| 337,490 | Gray | Mar. 9, 1886 |
| 1,985,631 | Davidson et al. | Dec. 25, 1934 |
| 2,171,796 | Kelling | Sept. 5, 1939 |
| 2,466,369 | Bunderson | Apr. 5, 1949 |
| 2,490,047 | Gilchrist et al. | Dec. 6, 1949 |